(12) United States Patent
Krueger et al.

(10) Patent No.: US 12,525,618 B2
(45) Date of Patent: Jan. 13, 2026

(54) METHOD AND SYSTEM FOR CONNECTING PLATE-LIKE COMPONENTS OF A BIPOLAR PLATE

(71) Applicant: Robert Bosch GmbH, Stuttgart (DE)

(72) Inventors: Philipp Krueger, Hoepfigheim (DE); Franz Wetzl, Mundelsheim (DE); Friedrich Kneule, Rutesheim (DE); Volker Henrichs, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 625 days.

(21) Appl. No.: 18/016,040

(22) PCT Filed: Jun. 30, 2021

(86) PCT No.: PCT/EP2021/067978
§ 371 (c)(1),
(2) Date: Jan. 13, 2023

(87) PCT Pub. No.: WO2022/012931
PCT Pub. Date: Jan. 20, 2022

(65) Prior Publication Data
US 2023/0352697 A1  Nov. 2, 2023

(30) Foreign Application Priority Data
Jul. 16, 2020 (DE) ..................... 10 2020 208 927.2

(51) Int. Cl.
*H01M 4/88* (2006.01)
*B23K 26/26* (2014.01)
(Continued)

(52) U.S. Cl.
CPC ........... *H01M 4/8896* (2013.01); *B23K 26/26* (2013.01); *B23K 2101/38* (2018.08); *H01M 2004/8694* (2013.01)

(58) Field of Classification Search
CPC ....... H01M 4/8896; H01M 2004/8694; H01M 8/021; H01M 8/0267; H01M 8/0297;
(Continued)

(56) References Cited

U.S. PATENT DOCUMENTS

2006/0054664 A1  3/2006  Strobel et al.

FOREIGN PATENT DOCUMENTS

| CN | 103878524 A | 6/2014 |
| CN | 210172797 U | 3/2020 |

(Continued)

OTHER PUBLICATIONS

Translation of International Search Report for Application No. PCT/EP2021/067978 dated Oct. 20, 2021 (3 pages).

*Primary Examiner* — Robert G Bachner
(74) *Attorney, Agent, or Firm* — Michael Best & Friedrich LLP

(57) ABSTRACT

The invention proposes a method for connecting plate-like components of a bipolar plate, comprising the steps of placing a first plate-like component on a clamping surface, placing a second plate-like component onto the first plate-like component, fitting a plurality of hold-down devices on an outer surface of the second plate-like component, said outer surface facing away from the first plate-like component and the clamping surface, wherein an envisaged seam line is kept free between the hold-down devices, pressing of the plate-like components together using all of the hold-down devices, wherein, for this purpose, a magnetic force acting in the direction of the clamping surface is applied to at least one of the hold-down devices, and welding the plate-like components along the seam line in a continuous operation.

10 Claims, 8 Drawing Sheets

(51) Int. Cl.
  *B23K 101/38* (2006.01)
  *H01M 4/86* (2006.01)
(58) Field of Classification Search
  CPC .. H01M 8/0247; H01M 8/0202; B23K 26/26;
       B23K 2101/38; Y02E 60/50
  See application file for complete search history.

(56) References Cited

FOREIGN PATENT DOCUMENTS

DE       10221951 A1    12/2003
  DE    202016008510 U1     3/2018
  DE    102018102642 A1     8/2019

METHOD AND SYSTEM FOR CONNECTING PLATE-LIKE COMPONENTS OF A BIPOLAR PLATE

BACKGROUND

The present invention relates to a method and a system for connecting plate-like components of a bipolar plate.

A fuel cell system often comprises a stack of a plurality of fuel cells in each of which an electrochemical process between oxygen and hydrogen occurs while providing electrical power. A single fuel cell consists substantially of a membrane-electrode assembly surrounded by bipolar plates. The latter comprises fine flow channels (the so-called "flow field") on approximately opposing surfaces for supplying reactants and for discharging reaction products. A bipolar plate can be composed of an anode metal sheet and a cathode metal sheet that are welded together and allow a cooling medium to pass through the interior. The material thickness of the sheets, which are often made of steel, can be one tenth of a millimeter or less.

The welding can be carried out by laser beam welding. In order to realize a low distortion, the process parameters for the welding process are selected such that as little energy as possible is input. This results in very narrow weld seams, whose seam width can typically be only a tenth of a millimeter or less, with a low melt bath volume. Overall, in combination with the high process speeds that are necessary as a result, this leads to poor gap bridging capability, so that gaps of 30-50 pm between the sheets can already lead to defects and thus leakages in the bipolar plate.

Because the welding process is quite sensitive with respect to the presence of component gaps, a clamping apparatus for producing a technical zero gap in the region of the joint is used. Due to tolerances of the anode and cathode sheets, it is therefore necessary to hold down the sheets on both sides of a weld seam to be produced. In the case of bipolar plates, a closed welding web is produced in order to ensure a closed sealing contour. For this purpose, in a plurality of steps, weld masks are applied in succession to the sheets to be joined, each mask holding down a portion of the contour. Thus, the welding web comprises a plurality of single seams with a start and end as well as their overlaps, ultimately leading to a closed seam. By contrast to a constantly running process, this can lead to process instabilities and increased susceptibility to failure.

SUMMARY

The problem addressed by the invention is to provide a method and/or a system for connecting plate-like components of a bipolar plate, which prevents the aforementioned disadvantages and in particular allows for a fully closed welding web.

The invention proposes a method for connecting plate-like components of a bipolar plate, comprising the steps of placing a first plate-like component on a clamping surface, placing a second plate-like component onto the first plate-like component, fitting a plurality of hold-down devices on the second plate-like component on a surface facing away from the first plate-like component and the clamping surface, wherein an envisaged seam line is kept free between the hold-down devices, pressing of the plate-like components together using all of the hold-down devices, wherein, for this purpose, a magnetic force acting in the direction of the clamping surface is applied to at least one of the hold-down devices, and welding the plate-like components along the seam line in a continuous operation.

The two plate-like components can comprise an anode sheet and a cathode sheet, as mentioned above. They are preferably configured as steel sheets and have a material thickness of preferably significantly below one millimeter, about one tenth of a millimeter or less. The first plate-like component, which can be the anode plate or the cathode plate, is first placed on a clamping surface. The flow field formed on the first plate-like component is already engraved and aims in the direction of the clamping surface. The second plate-like component is then placed onto the first plate-like component, wherein the flow field of the second plate-like component faces away from the clamping surface. It is envisaged that the two plate-like components are joined together in this assembly.

To form a zero gap in the envisaged seam line, a plurality of hold-down devices are used. These are configured so as to press the second plate-like component onto the first plate-like component so that a flush contact is made between the two plate-like components in the envisaged seam line. Here, all hold-down devices are pressed onto the second plate-like component at the same time, rather than applying them one after the other, per usual. By using a magnetic force acting on at least one of the hold-down devices, a closed seam line can also be enclosed on both sides without restricting the accessibility for a welding apparatus from outside the second plate-like component. The application of the magnetic force could be achieved by a magnetic unit, for example by a permanent magnet or a selectively activatable electromagnet. The at least one hold-down device on which a magnetic force is applied could also comprise a permanent magnet, an electromagnet, or a body made of a magnetic material. Because all of the hold-down devices are used simultaneously for compressing the plate-like components, a closed seam line can be defined that is kept completely free. In particular, the hold-down device(s) can be subjected to a magnetic force that would require a mechanical linkage due to their location on the seam line, which would pose an obstacle for a welding apparatus.

This leads to a significant improvement in the properties of the weld seam of a bipolar plate that can thus be implemented, because defects, local leakages, and thus the rejects can be reliably and reproducibly reduced. The cost of manufacturing a bipolar plate can further be reduced, because the number of working steps and the overall length of the weld seam are reduced.

In one advantageous embodiment, the welding includes laser welding. It is conceivable to use, for example, an Nd:YAG or CO2 laser. These types of lasers can allow for very narrow weld seams and a low weld bath volume by means of suitable process control. In particular, Nd:YAG lasers can be focused very precisely and produce particularly fine weld seams.

As mentioned above, the seam line preferably comprises a circumferential welding web. The weld seam can be produced in a single pass along the seam line without interruption, because there are no obstacles along the seam line, and can thus overcome the disadvantages of the prior art by using the at least one magnet-assisted hold-down device.

In the method according to the invention, the fitting of hold-down devices can also include the arranging of at least one inner hold-down device within the seam line and at least one hold-down device outside the seam line, wherein the magnetic force is applied to the at least one inner hold-down device. A hold-down device arranged on the inside of the seam line, i.e. on the inner edge of the envisaged seam line, does not require any further mechanical means in order to carry out its fixation. Consequently, no mechanical means projecting over the seam line are necessary that would hinder the welding apparatus. Only one hold-down device can be sufficient, in particular an internal one, provided a zero gap can be ensured.

The problem with respect to the system is solved by a system having the features of the independent system claim. The invention proposes a system for connecting plate-like components of a bipolar plate is proposed, comprising a clamping plate having a clamping surface, a plurality of hold-down devices for pressing two plate-like components on the clamping surface, at least one magnetic unit, and a welding apparatus, wherein the at least one magnetic unit is arranged on a side of the clamping surface facing away from the hold-down devices, wherein the at least one magnetic unit is configured so as to apply a magnetic force to at least one of the hold-down devices, so that the at least one hold-down device in question is pressed in the direction of the clamping surface, wherein the hold-down devices are configured so as to keep an envisaged seam line between the hold-down devices in a state of being pressed onto the plate-like components, and wherein the welding apparatus is configured so as to weld the plate-like components along the seam line.

The clamping plate can have a flat surface on which one of the plate-like components can be directly applied. This surface, also referred to as the clamping surface, could also have rills, projections, grooves, or other features that can be brought into engagement with a geometry of the first plate-like component. In the design of the plate-like components as thin sheets, each of which form a flow field on their outer sides, flow channels of a flow field can consequently be used for the position-precise alignment of the first plate-like component on the clamping surface.

The at least one magnetic unit can comprise at least one permanent magnet and/or at least one electromagnet. The magnetic unit can be arranged below or at least partially in the clamping plate, wherein the magnetic field lines can extend through the clamping plate and the plate-like components located thereon. The at least one magnetic unit can pull one or more of the hold-down devices in the direction of the clamping surface, so that the plate-like components applied thereon are pressed together on the edge of the envisaged seam line. At the envisaged seam line, a flush contact can thus be achieved, as described above.

In an advantageous embodiment, the hold-down devices comprise at least one outer hold-down device and at least one inner hold-down device, wherein the at least one inner hold-down device is configured so as to enclose the seam line to the at least one outer hold-down device. The at least one inner hold-down device is completely surrounded by a closed seam line. It can be placed inside the edge on the seam line. The outer hold-down devices are placed on the outside of the seam line. Instead of by the magnetic unit, the latter can also be held by conventional mechanical mechanisms, for example clamping tools, clips, levers, actuators, or the like, because they do not overlap with the envisaged seam line.

In an advantageous embodiment, the at least one inner hold-down device comprises at least two segments that are mechanically coupled together. The segments form separate hold-down bodies, which are coupled to one another by mechanical means. The coupling could be realized by form-elastic joints, for example compression or tension springs. The division into a plurality of segments allows a more elastic application to be achieved on the plate-like components. In order to ensure a zero gap over the entire seam line, high retention forces are sometimes required, in which local deformations of the plate-like components occur. To avoid application that is locally only selective, the divided segments are particularly suitable. However, the coupling between the segments allows for their lateral alignment with one another.

Particularly preferably, the at least one inner hold-down device comprises at least two segments that are mechanically independent from one another. The segments could be aligned via a separate guide device or via shape features of the second plate-like component. It cannot be ruled out that an inner hold-down device comprises both mechanically coupled as well as independent segments.

For the alignment, the at least one hold-down device could comprise at least one projection for engaging with a recess of the plate-like components. The recess could be realized by a flow channel of a flow field, for example, in which a suitably shaped recess can engage and define the lateral position of the hold-down device in question.

In a preferred embodiment, at least one of the hold-down devices is chamfered on a region adjacent to the envisaged seam line in a direction facing away from the seam line. The welding apparatus can thus be provided with more space to reach the seam line.

In a particularly advantageous embodiment, the magnetic unit comprises at least one electromagnet. It can be activated after the plate-like components have been applied, and it can be switched off after the welding process has been completed, which makes the handling of the components significantly easier. It can also be part of a conveying unit in a flow process, in which a plurality of bipolar plates are produced continuously and sequentially.

BRIEF DESCRIPTION OF THE DRAWINGS

Further measures improving the invention are described in more detail below on the basis of the figures, together with the description of the preferred embodiment examples of the invention.

DETAILED DESCRIPTION

Figure 1:
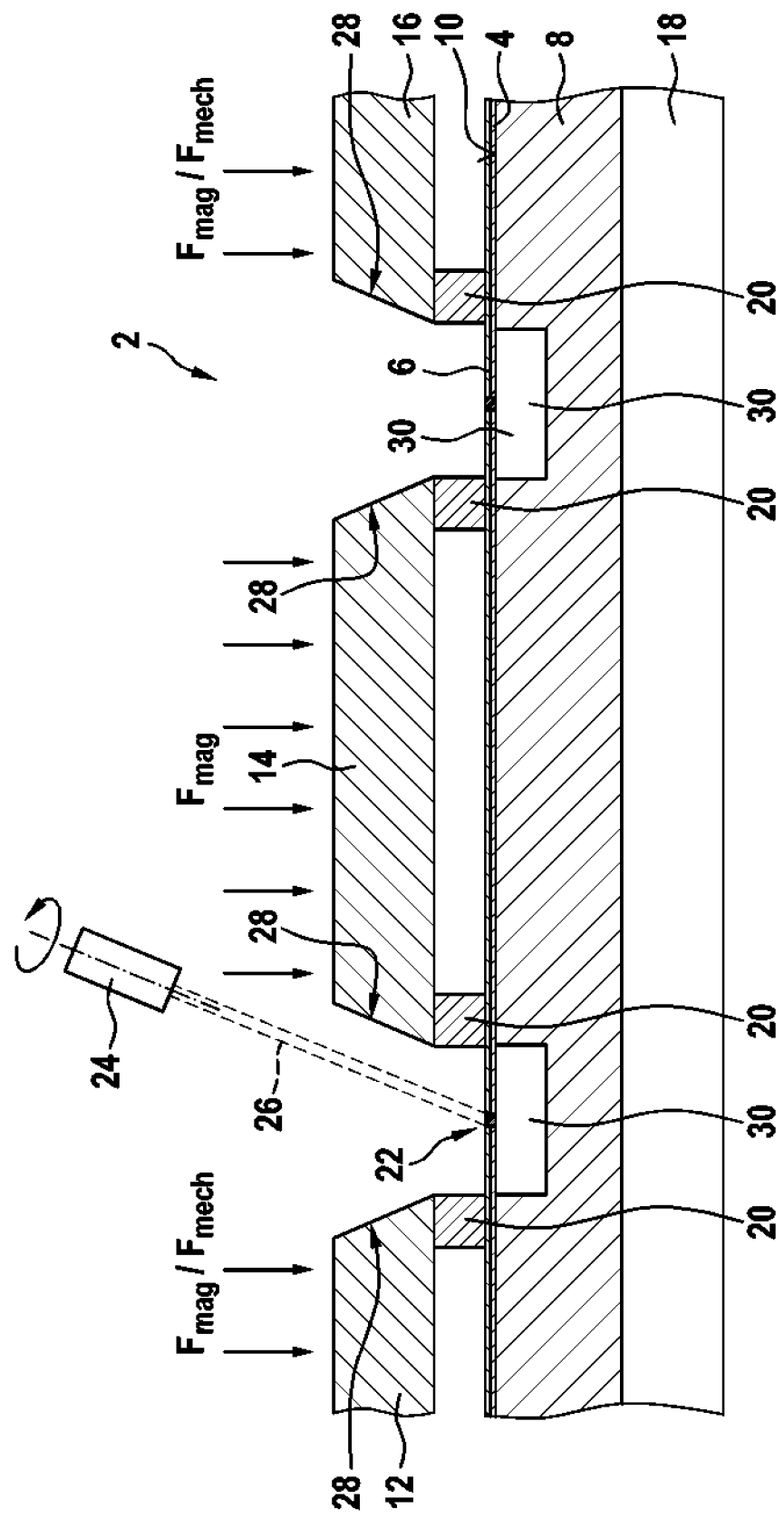
FIG. 1 a schematic view of a system in a lateral section

FIG. 1 shows a system 2 for connecting two plate-like components 4 and 6 of a bipolar plate. For this purpose, the system 2 comprises a clamping plate 8 having a clamping surface 10. Further, a plurality of hold-down devices 12, 14, and 16 are provided in order to press the two plate-like components 4 and 6 on the clamping surface 10. While the laterally outer hold-down devices 12 and 16 shown in the drawing plane can also be pressed in the direction of the clamping plate 8 by a mechanical tensioning or retaining device, the inner hold-down device 14 is pushed by a magnetic force in the direction of the clamping plate 8. For this purpose, a magnetic unit 18 is arranged below the clamping plate 8. If the hold-down devices 12, 14 and 16 are at least partially formed from a magnetic material, they are attracted by the magnetic unit 18. Here, they press onto the plate-like components 4 and 6 with a respective abutment portion 20. An envisaged seam line 22 is fixed on both sides in a close-knit manner so that there is locally flush contact between the two plate-like components 4 and 6. A welding apparatus 24, which is configured by way of example as a laser welding apparatus and emits a laser beam 26, can weld the two plate-like components 4 and 6 along the seam line 22.

To follow the arbitrarily shaped seam line 22, the welding apparatus 24 can rotate, for example, about two axes and/or can be moved translationally along two axes. To sufficiently keep free the seam line 22, the side edges 28 of the hold-down devices 12, 14, and 16 are chamfered in a direction facing away from the seam line 22. In order to avoid welding the plate-like components 4 and 6 with the clamping plate 8, a recess 30 is also provided below the envisaged seam line 22.

Figure 2:
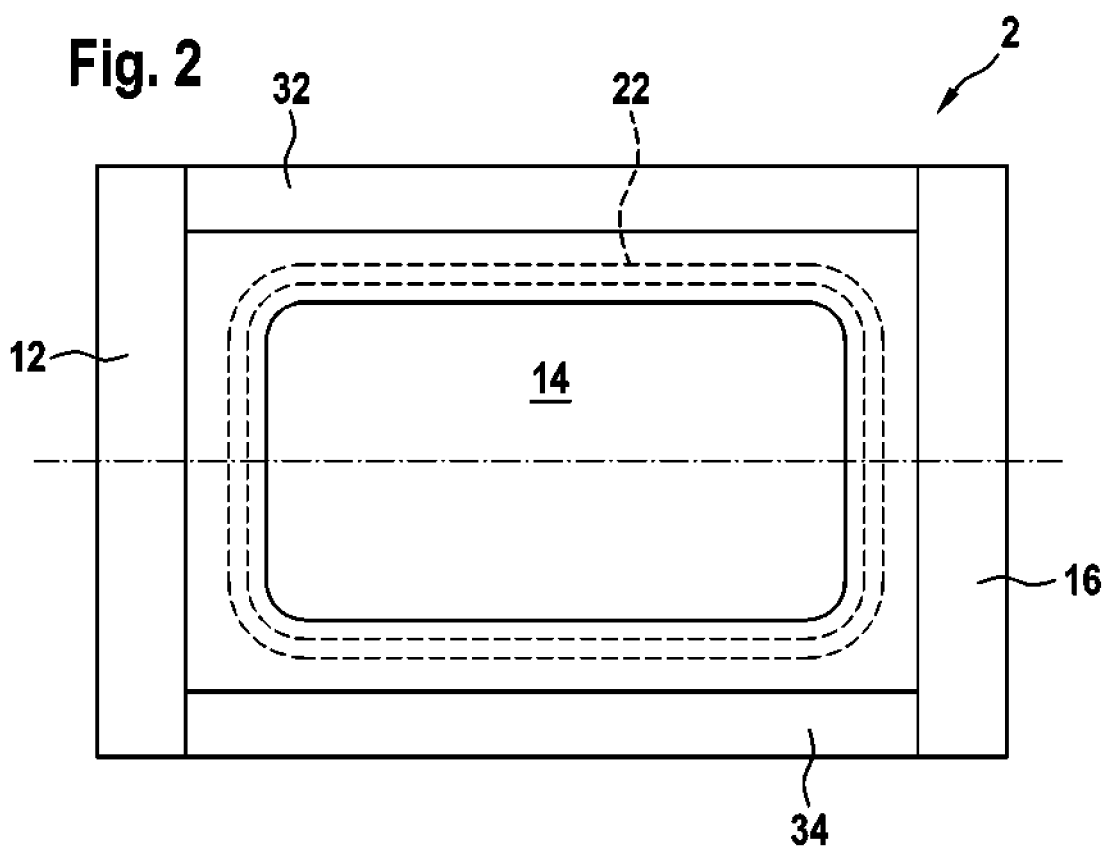
FIG. 2 a top view of the system

In FIG. 2, the system 2 is shown in an aerial view. Here, the two lateral hold-down devices 12 and 16 are shown as elongated components that are parallel to and spaced apart from one another. They can be supplemented by additional hold-down devices 32 and 34, which run perpendicularly thereto and are also arranged parallel to and spaced apart from one another. The inner hold-down device 14 is provided in the form of a rounded rectangle. The hold-down devices 12, 14, 16, 33, and 34 enclose the envisaged seam line 22, which also has the shape of a rounded rectangle, by way of example.

Figure 3:
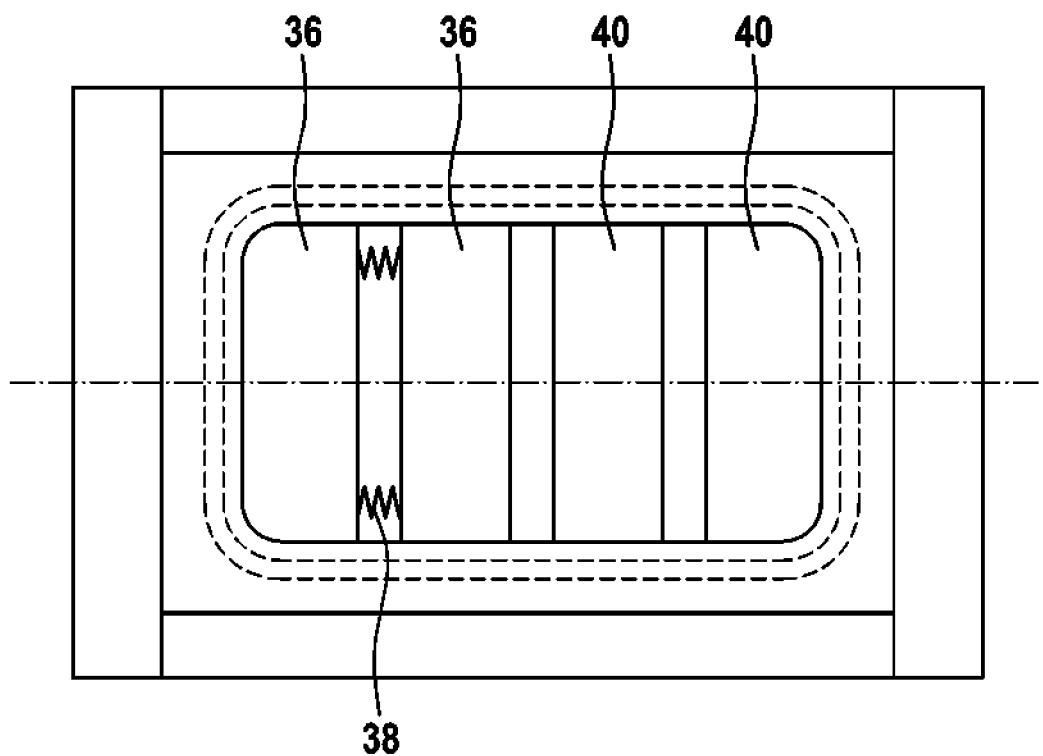
FIGS. 3 to 5, the system with segmented inner hold-down

In FIG. 3, a modification is shown in which the inner hold-down device 14 is divided into a plurality of segments 36 and 40. The two segments 36 at left in the drawing plane are mechanically coupled to one another by a respective coupling spring 38. This can be a compression or tension spring configured so as to push into a predetermined neutral position. The two segments 40 arranged at right in the drawing plane are independent from the other segments 36 and also do not communicate with other components. Thus, for example, they could be guided via guide geometries arranged on the second plate-like component 6 or formed therein through the flow field arranged thereon.

Figure 4:
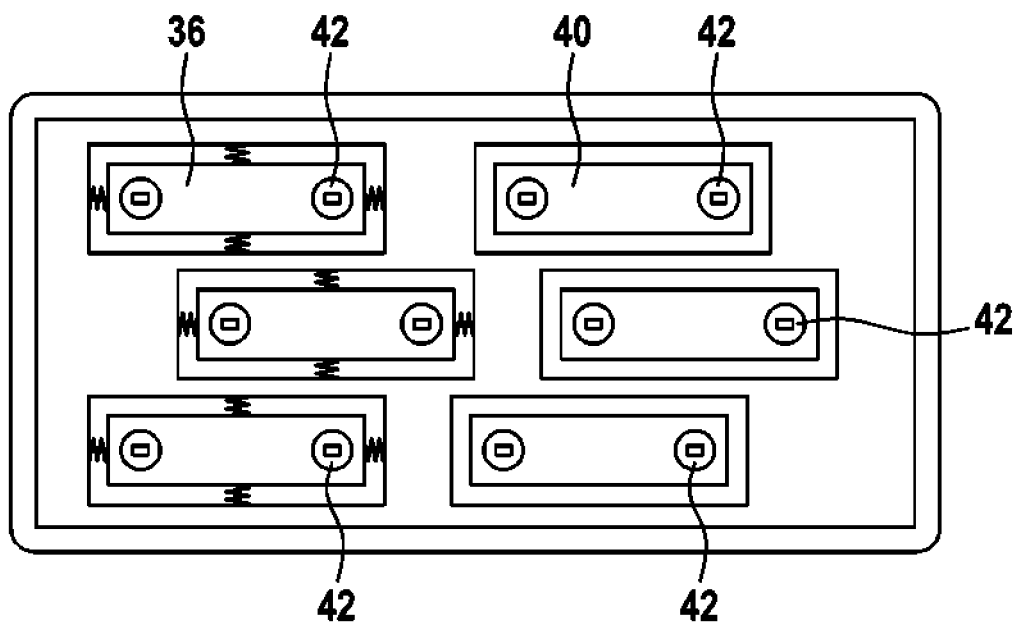

In FIG. 4 a further modified variant is shown, in which a plurality of segments 36 and 40 are provided, which are mechanically coupled or independently configured. The segments 36 and 40 each have a recess 42 through which the aforementioned welding apparatus 24 can carry out punctiform welding, approximately in the form of one top-stitch each.

Figure 5:
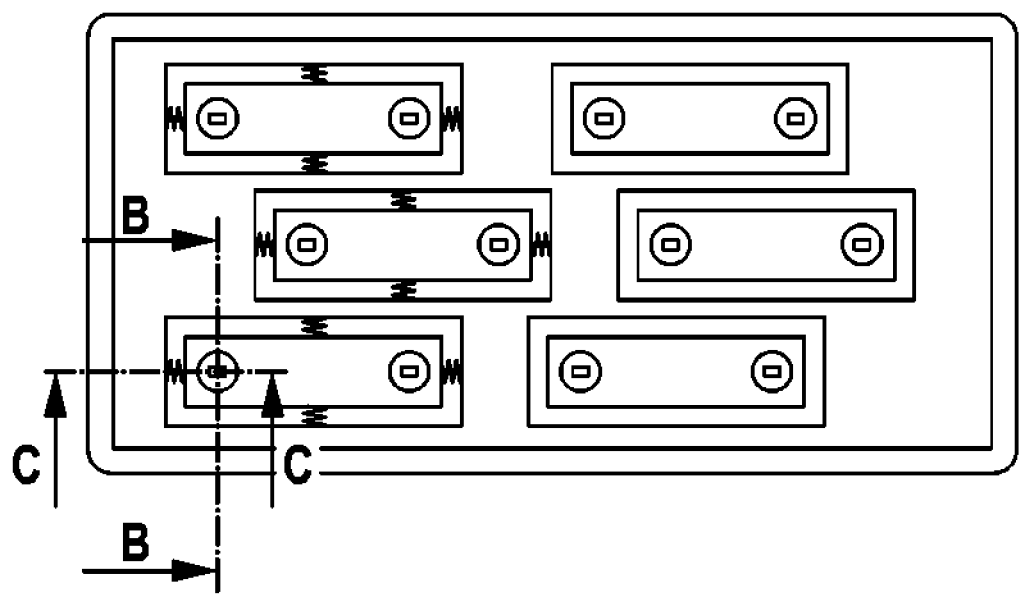

The shape fidelity can thus be improved in particular for larger bipolar plates. In FIG. 5, the sectional planes B-B and C-C are marked, which denote the cutaway views in FIGS. 7 and 8, in which the top-stitch and the orientation are more easily seen.

Figure 6A:
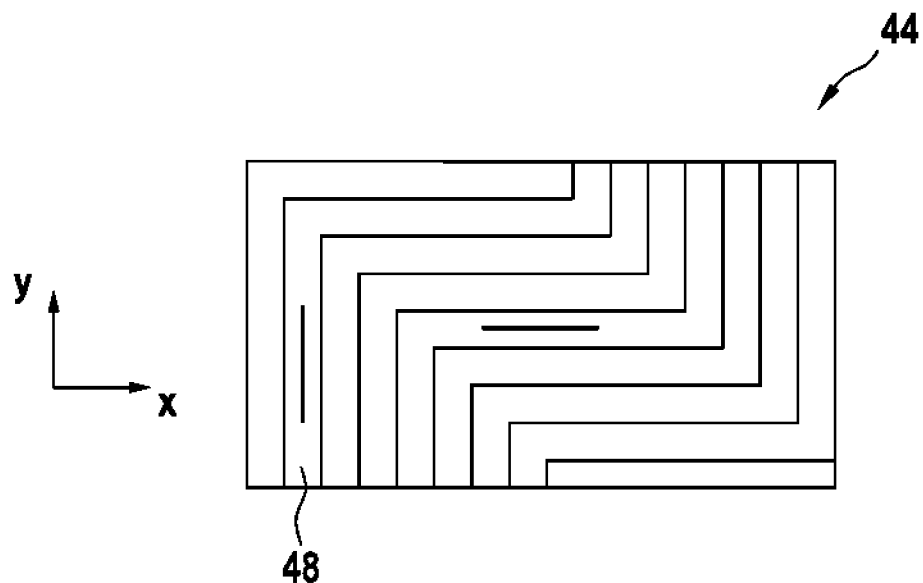
FIGS. 6a and 6b different flow fields on the plate-like components
Figure 6B:
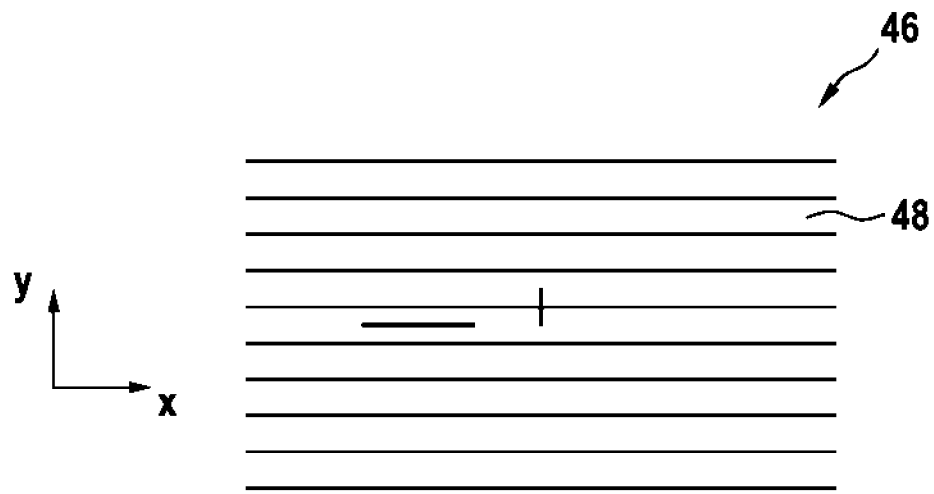

FIGS. 6a and 6b each show a flow field 44 and 46 comprising flow channels 48 for supplying reagents and discharging reaction products. The flow field 44 shown in FIG. 6a comprises flow channels 48 that run in directions perpendicular to one another. The flow field 44 is consequently a cross-flow field. The flow field 46 in FIG. 6b, on the other hand, comprises flow channels 48 with exclusively parallel courses, so that it can be referred to as a counter-flow flow field. If a segment 40 is applied on one of the flow fields 44 or 46, shape features of the flow channels 48 can be used for the alignment. While the flow field 44 of FIG. 6a allows for a slight orientation in two spatial directions, this is only readily possible in one spatial direction for the flow field 46. However, if individual flow channels 48 have locally different heights, shape features can thereby be created at which a precise alignment in two spatial directions is possible.

Figure 7:
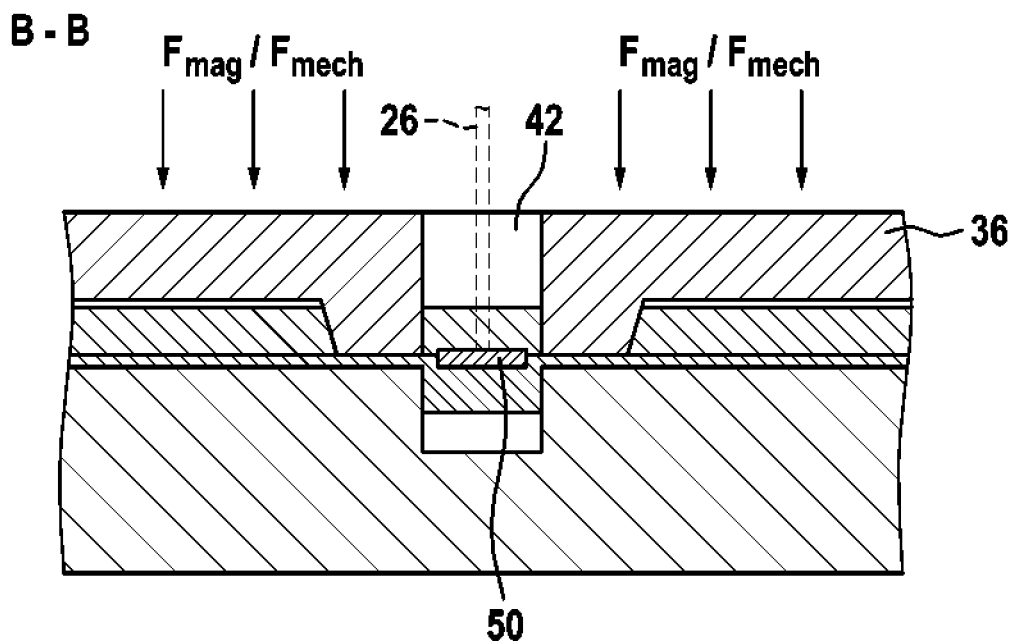
FIGS. 7 to 10 detailed sectional views of the system

FIG. 7 shows the sectional plane B-B. There, a lateral hold-down device 36 with the recess 42 can be seen, through which the laser beam 26 can produce a top-stitch 50.

Figure 8:
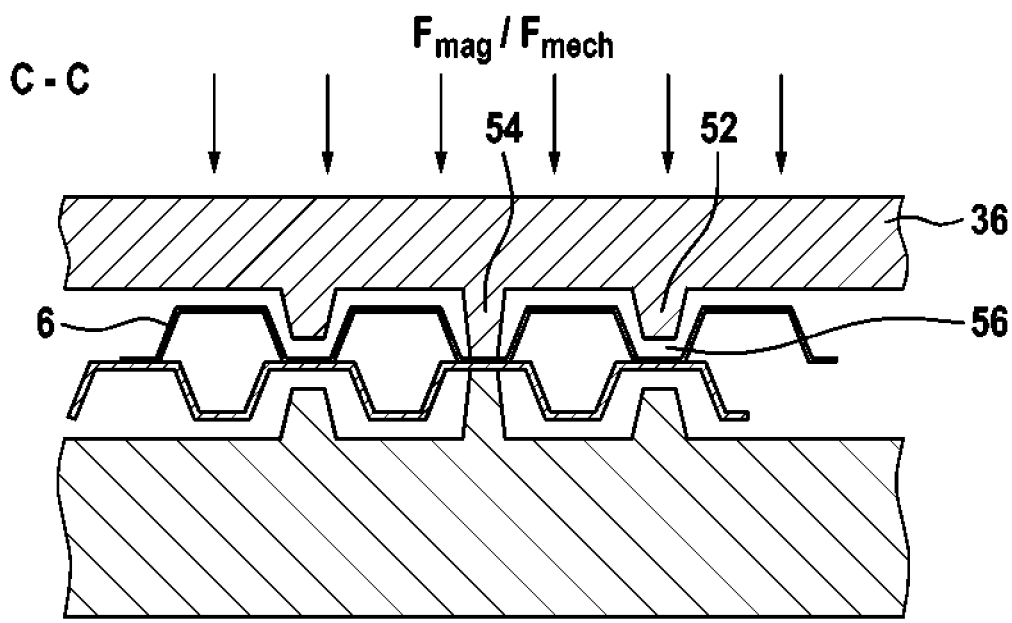

In FIG. 8, the hold-down device 36 is shown, possessing a plurality of projections 52 and 54, which mesh with recesses 56 of the first plate-like component 6 and align the hold-down device 36 with them. In this case, the projections 52 are dimensioned such that they indeed project into the recesses 56 but do not touch the second plate-like component 6. This is done only at the projection 54, so as to establish a defined surface contact only there.

Figure 9:
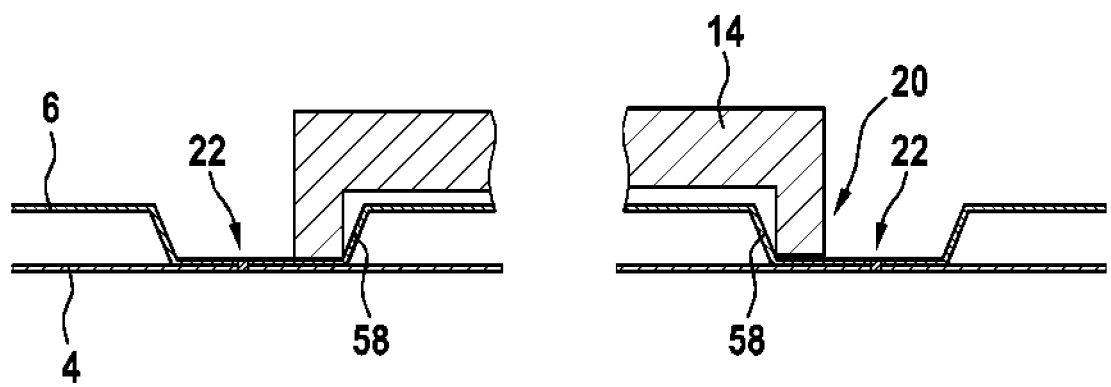

FIG. 9 shows the inner hold-down device 14, whose application portion 20 is centered on flanks 58 of the second plate-like component 6. The inner hold-down device 14 can thereby be precisely placed on the second plate-like component and consequently arranged inside the edge of the envisaged seam line 22.

Figure 10:
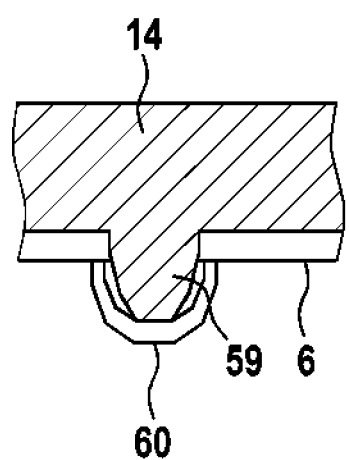

FIG. 10 shows the inner hold-down device 14 with a projection 59, whose cross-section is rounded at its outer end and engages with a rounded recess 60 of the second plate-like component 6. With the rounded shape, a simple self-centering occurs and can sometimes prevent a tilting when the inner hold-down device 14 is applied.

Figure 11:
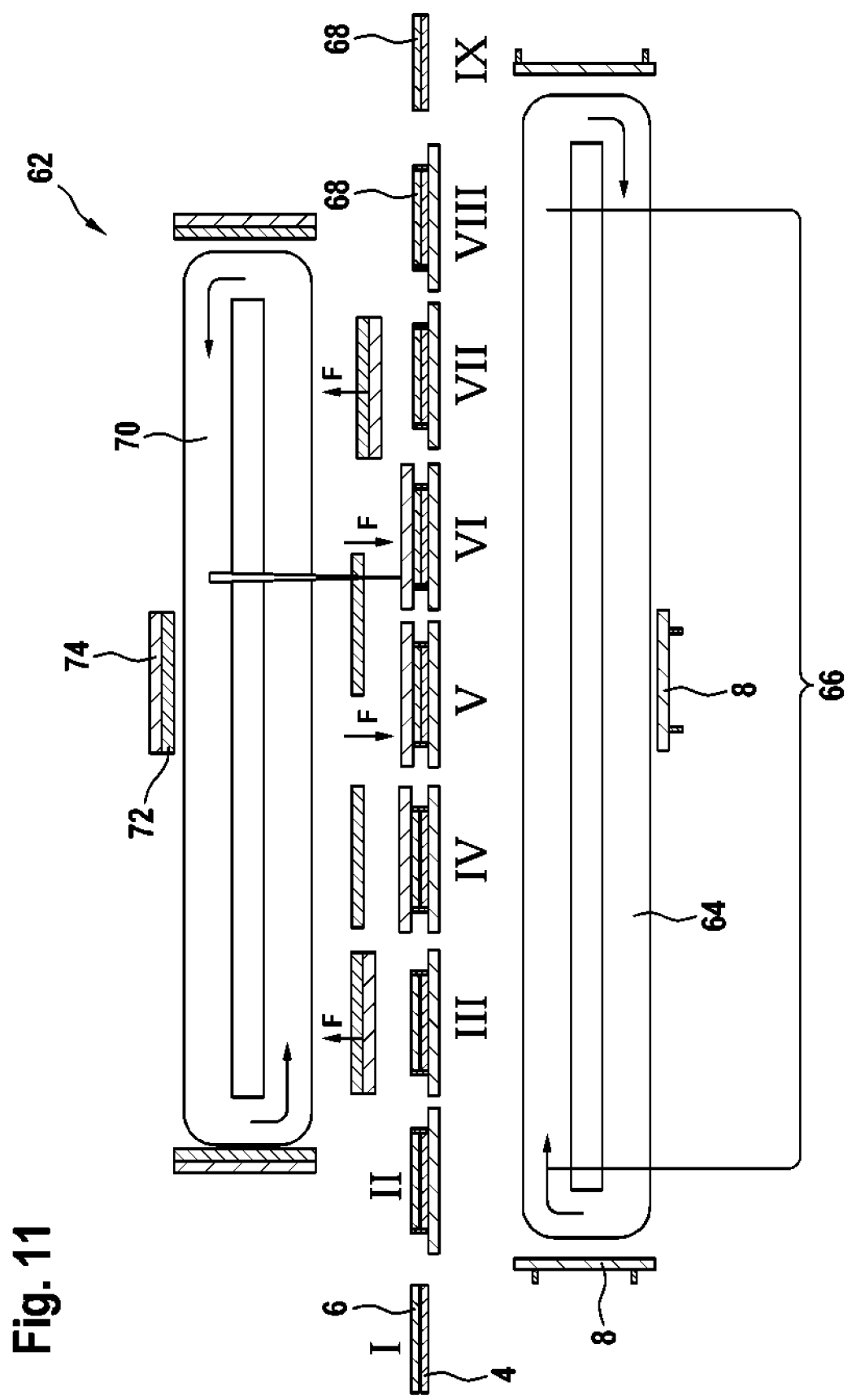
FIG. 11 a modification of the system for line manufacturing

FIG. 11 illustrates a possible further development in the form of a continuous system 62 for the line manufacturing of bipolar plates. Here, a plurality of clamping plates 8 are guided continuously at a first conveyor unit 64. Along a utility path 66, the clamping plates 8 can be equipped (see II) with fed plate-like components 4 and 6 (see I). Then, hold-down devices 74 are fed (III) and placed on the plate-like components 4 and 6 (IV). A magnetic force is applied (V) to the hold-down device 74, and then the welding of the two plate-like components 4 and 6 (VI) occurs. Subsequently, the hold-down devices 74 are detached (VII) so that resulting bipolar plates 68 (VIII) can be removed (IX). The hold-down devices 74 can be transported via a second conveyor unit 70, which could continue to transport and lay additional magnetic clamping plates 72, which can also be used for carrying the hold-down devices 74.

Figure 12:
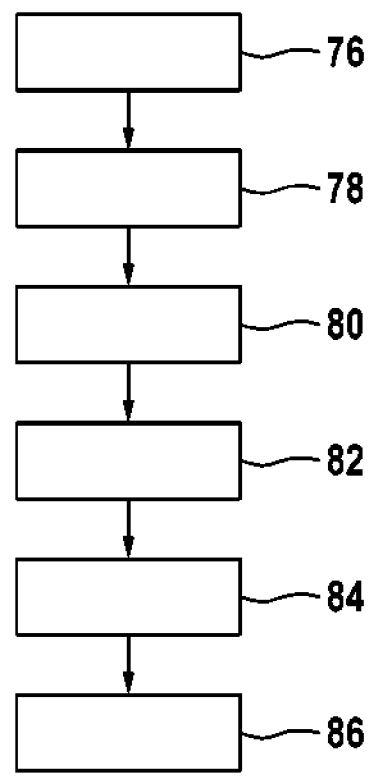
FIG. 12 a schematic, block-based view of the method.

Finally, FIG. 12 shows the schematic representation of the method according to the invention. The following steps occur here: placing 76 a first plate-like component 4 on a clamping surface 10, placing 78 a second plate-like component 6 onto the first plate-like component 4, fitting 80 a plurality of hold-down devices on the second plate-like component 6 on a side facing away from the first plate-like component 4 and the clamping surface 10, wherein an envisaged seam line 22 is kept free between the hold-down devices. Then, the following steps occur: a pressing 82 of the plate-like components 4, 6 together using all of the hold-down devices, wherein, for this purpose, a magnetic force 84 acting in the direction of the clamping surface 10 is applied to at least one of the hold-down devices. Finally, the welding 86 of the plate-like components 4, 6 occurs along the seam line 22 in a continuous operation.

The invention claimed is:

1. A method for connecting plate-like components (4, 6) of a bipolar plate, comprising the following steps:
   placing (76) a first plate-like component (4) on a clamping surface (10),
   placing (78) a second plate-like component (6) onto the first plate-like component (4), fitting (80) a plurality of hold-down devices (12, 14, 16, 32, 34, 74) on an outer surface of the second plate-like component (6), said outer surface facing away from the first plate-like component (4) and the clamping surface (10), wherein an envisaged seam line (22) is kept free between the hold-down devices (12, 14, 16, 32, 34, 74), pressing (82) of the plate-like components (4, 6) together using all of the hold-down devices (12, 14, 16, 32, 34, 74), wherein, for this purpose, a magnetic force acting in the direction of the clamping surface (10) is applied to at least one of the hold-down devices (12, 14, 16, 32, 34, 74), and welding (84) the plate-like components (4, 6) along the seam line (22) in a continuous operation.

2. The method according to claim 1, wherein the welding (86) includes laser welding.

3. The method according to claim 1, wherein the fitting (80) of hold-down devices (12, 14, 16, 32, 34, 74) includes arranging at least one inner hold-down device (14) within the seam line (22) and at least one hold-down device (12, 16, 32, 34, 74) outside the seam line (22), and wherein the magnetic force is applied to the at least one inner hold-down device (14).

4. A system (2, 62) for connecting plate-like components (4, 6) of a bipolar plate, comprising:
a clamping plate (8) having a clamping surface (10),
a plurality of hold-down devices (12, 14, 16, 32, 34, 74) for pressing two plate-like components (4, 6) on the clamping surface (10),
at least one magnetic unit (18), and
a welding apparatus (24),
wherein the at least one magnetic unit (18) is arranged on a side of the clamping surface (10) facing away from the hold-down devices (12, 14, 16, 32, 34, 74),
wherein the at least one magnetic unit (18) is configured so as to apply a magnetic force to at least one of the hold-down devices (12, 14, 16, 32, 34, 74) so that the at least one hold-down device (12, 14, 16, 32, 34, 74) is pressed in the direction of the clamping surface (10),
wherein the hold-down devices (12, 14, 16, 32, 34, 74) are configured to keep an envisaged seam line (22) between the hold-down devices (12, 14, 16, 32, 34, 74) in a state of being pressed onto the plate-like components (4, 6), and
wherein the welding apparatus (24) is configured to weld the plate-like components (4, 6) along the seam line (22).

5. The system (2, 62) according to claim 4,
wherein the hold-down devices (12, 14, 16, 32, 34, 74) comprise at least one outer hold-down device (12, 16, 32, 34, 74) and at least one inner hold-down device (14), wherein the at least one inner hold-down device (14) is configured to enclose the seam line (22) to the at least one outer hold-down device (12, 16, 32, 34, 74).

6. The system (2, 62) according to claim 4,
wherein the at least one inner hold-down device (14) comprises at least two segments (36) that are mechanically coupled together.

7. The system (2, 62) according to claim 4,
wherein the at least one inner hold-down device (14) comprises at least two segments (40) that are mechanically independent from one another.

8. The system (2, 62) according to claim 4,
wherein the at least one hold-down device (12, 14, 16, 32, 34, 74) comprises at least one projection (52, 54) for engaging with a recess (56) of the plate-like components (4, 6).

9. The system (2, 62) according to claim 4,
wherein at least one of the hold-down devices (12, 14, 16, 32, 34, 74) is chamfered on a region adjacent to the envisaged seam line (22) in a direction facing away from the seam line (22).

10. The system (2, 62) according to claim 4,
wherein the magnetic unit (18) comprises at least one electromagnet.

* * * * *